Feb. 6, 1940.   W. D. SCHANCK   2,189,084
RELIEF VALVE
Filed Dec. 31, 1938   3 Sheets-Sheet 1
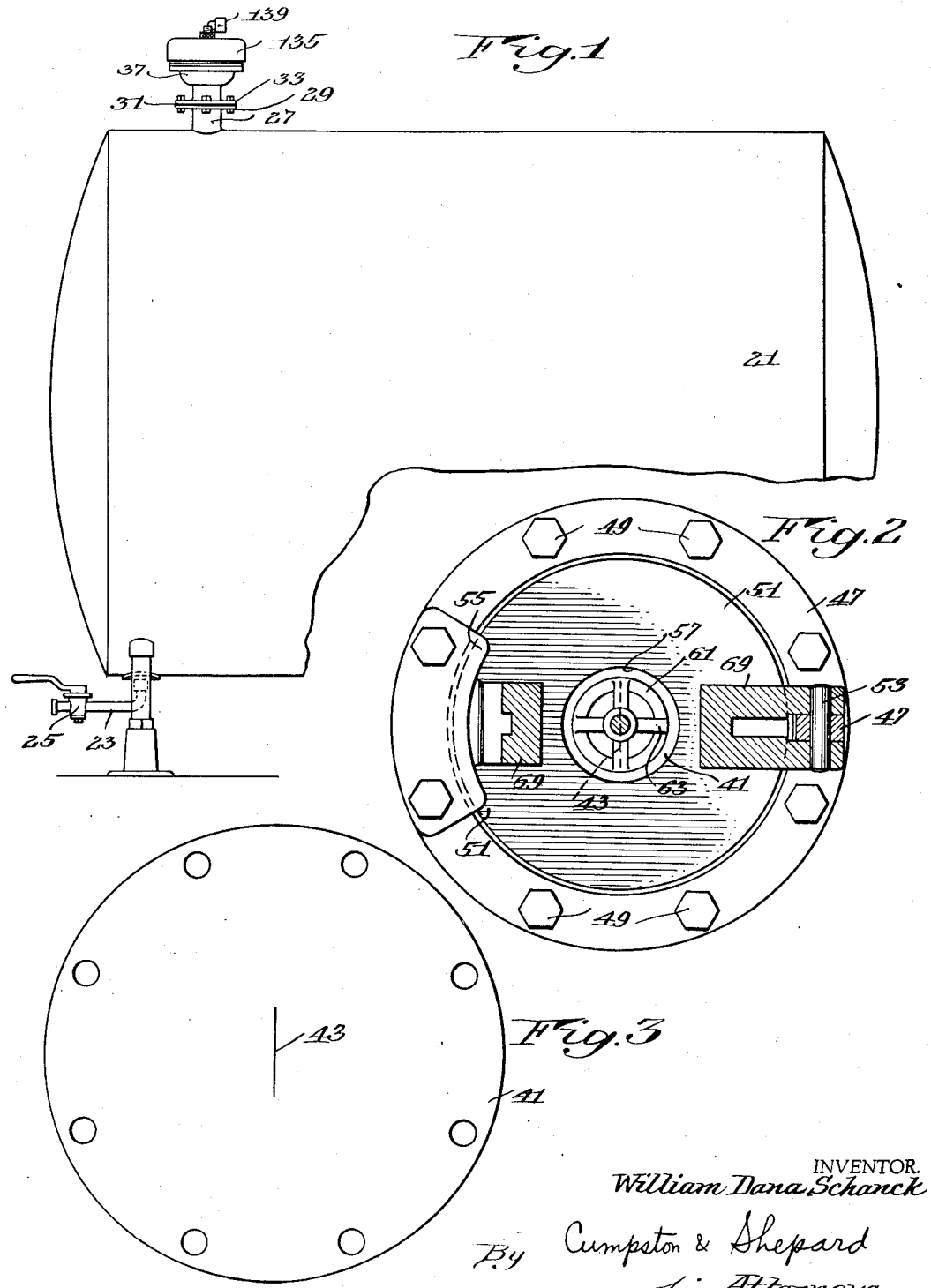
INVENTOR.
William Dana Schanck
By Cumpston & Shepard
his Attorneys Feb. 6, 1940.  W. D. SCHANCK  2,189,084
RELIEF VALVE
Filed Dec. 31, 1938  3 Sheets-Sheet 2
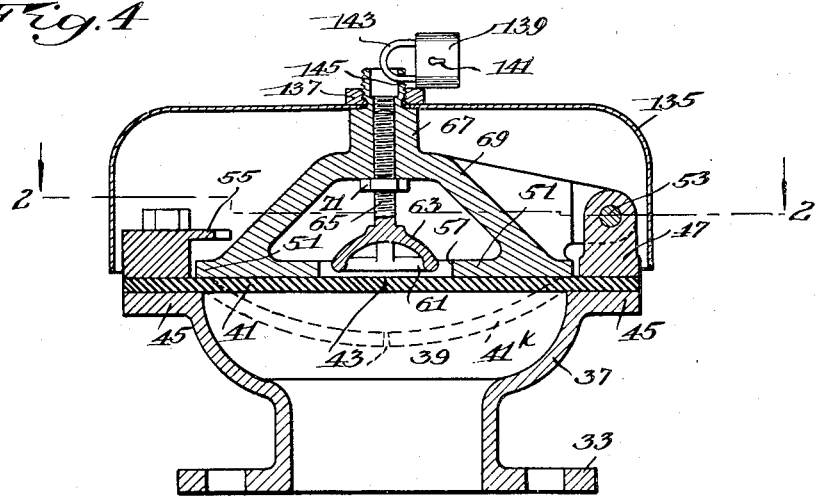
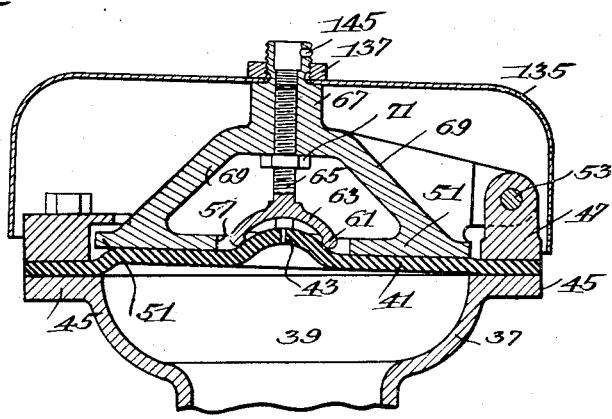
INVENTOR.
William Dana Schanck
By Cumpston & Shepard
his Attorneys

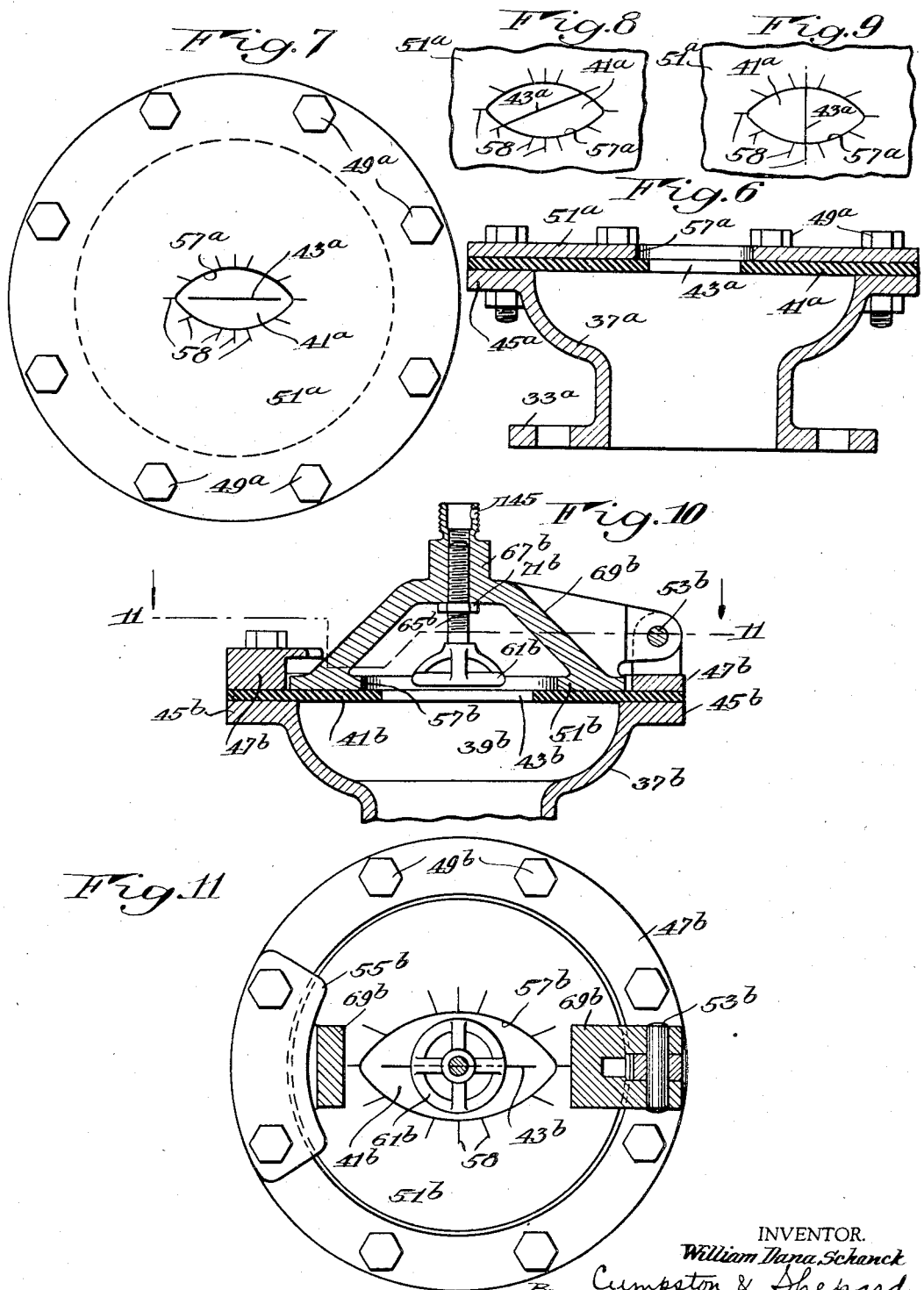

Patented Feb. 6, 1940

2,189,084

UNITED STATES PATENT OFFICE 2,189,084

RELIEF VALVE

William Dana Schanck, Rochester, N. Y., assignor to The Pfaudler Co., Rochester, N. Y., a corporation of New York Application December 31, 1938, Serial No. 248,720

7 Claims. (Cl. 137—53)

This invention concerns relief valves for relieving fluid pressure.

An object of the invention is to provide a generally improved relief valve which is more satisfactory than those heretofore known.

Another object is to provide such a relief valve which is effective to relieve excess fluid pressure on either side of the valve.

Still another object is the provision of such a valve which is free from all springs, thus obviating the expense of springs and the danger of faulty operation due to possible breakage of springs.

A further object is the provision of a relief valve in which the magnitude of pressure at which the valve will open or "blow" can be readily changed or adjusted within wide limits, and of a valve which will reliably function at the intended pressure.

A still further object is the provision of a relief valve particularly arranged and adapted for application to a tank to prevent the existence of a vacuum within the tank and to prevent excessive pressure therein, although capable also of other uses.

To these and other ends the invention resides in certain improvements and combinations of parts, all as will be hereinafter more fully described, the novel features being pointed out in the claims at the end of the specification.

In the drawings:

Fig. 1 is a side elevation of a tank having applied thereto a relief valve constructed in accordance with a preferred embodiment of the present invention;

Fig. 2 is a horizontal section through the relief valve taken substantially on the line 2—2 of Fig. 4, with the cover omitted;

Fig. 3 is a face view of a flexible diaphragm constituting part of the valve;

Fig. 4 is a vertical section taken centrally through the valve with the parts in one position;

Fig. 5 is a similar view showing the parts in a different position;

Fig. 6 is a vertical section through a modified form of construction;

Fig. 7 is a plan of the valve shown in Fig. 6 with the parts adjusted to open at one pressure;

Fig. 8 is a plan of a fragment of the valve, adjusted to open at a higher pressure;

Fig. 9 is a similar fragmentary plan, adjusted to open at a still higher pressure;

Fig. 10 is a vertical section taken centrally through still another modified construction in accordance with the invention, and Fig. 11 is a horizontal section taken substantially on the line 11—11 of Fig. 10.

The same reference numerals throughout the several views indicate the same parts.

The present application is a continuation in part of my application Serial No. 171,063, filed October 26, 1937, now Patent No. 2,166,730, granted July 18, 1939, for Relief valve.

In the first form of valve herein disclosed as an illustrative embodiment of the invention, the valve is intended to be attached to a tank, and to prevent the formation of a vacuum within the tank, and to permit pressure within the tank to build up to a predetermined magnitude, but to open when this magnitude of pressure is reached, preventing further increase of pressure. Such a valve is useful in many places, as for example, on the tanks of a brewery. In brewery practice it is common to hold the beer under certain pressure during part of the beer making process, but if the pressure should accidentally exceed the proper amount (as might happen for example if a pump were not turned off when the tank became full), then the tank might be damaged. Also, it sometimes happens that beer or other liquid may be withdrawn from a closed tank through an outlet near the bottom thereof, and if the opening of a vent is neglected, a vacuum may be created in the tank which may cause collapse or other damage to the tank. The first form of valve now to be described prevents any such damage either by vacuum or excessive pressure, and is capable of use wherever it is desired to avoid either vacuum or excess pressure in a tank, pipe line, or other receptacle or container.

Merely to illustrate one use of the present valve, there is shown in Fig. 1 a tank 21 having an outlet conduit 23 leading from its bottom and controlled by a valve 25. Near the top of the tank is an upstanding annular flange 27 terminating in an outwardly extending radial flange 29.

Secured on the flange 29 with an interposed gasket 31 is the lower flange 33 of the valve body indicated in general by the numeral 37. This body has an interior chamber 39 (Fig. 4) the top of which is closed by a diaphragm 41 of flexible, resilient, and elastic material, such for example as natural or artificial rubber, or rubber-like composition. Near its center the diaphragm 41 is provided with a slit 43. The diaphragm may be circular or of any other convenient shape, and the marginal edge thereof is clamped between a flange 45 on the valve body 37, and an overlying ring 47 secured to the valve body by suitable means such as bolts 49.

In making the slit 43 in the diaphragm preferably no material is removed, but simply a cut is made through the thickness of the diaphragm material. When the diaphragm is mounted between the flange 45 and the ring 47, it is not tensioned or distended, but is clamped in position either in its normal undistended condition, or preferably with a slight radial compression. Such radial compression may be secured by confining the periphery of the diaphragm within a band or flange of slightly smaller diameter than the normal diameter of the diaphragm, or preferably merely by the clamping action of the members 45 and 47 upon the margin of the diaphragm, which clamping action will exude some of the resilient diaphragm material in a radially inward direction, thus causing the desired slight radial compression. Such compression in the diaphragm will cause it to tend to deflect or belly out of the plane of its marginal edges, and when the pressure on both faces of the diaphragm is equal, it will assume a position bellying slightly downwardly, somewhat between the full line position and the dotted line position of Fig. 4, the slit 43 remaining closed.

Overlying the top of the diaphragm, within the ring 47, is a plate 51 pivoted at 53 to a lug rising from one side of the ring 47. Diametrically opposite the pin 53 the ring 47 is provided with a lip 55 overlying the edge of the plate 51 to limit possible upward motion thereof. The plate 51 is of annular shape, having its center cut out as indicated at 57, the diameter of the hole 57 being substantially less than the diameter of the exposed under face of the diaphragm, but being sufficient to overlie part or preferably all of the slit 43 and some of the surrounding area of the diaphragm. Surrounding atmospheric pressure may obtain access to the upper surface of the diaphragm through this opening 57.

With this construction, the slit in the diaphragm will open when the diaphragm is subjected to a sufficient difference in fluid pressure on opposite sides thereof, irrespective of which side has the higher pressure, but the plate 51 backs up the top surface of the diaphragm when the pressure on the bottom surface thereof is higher than on the top surface, and thus reduces the effective diameter of the diaphragm, so that the diaphragm will withstand a greater differential pressure on its under surface, before the slit 43 opens, than it will withstand on its upper surface.

If the pressure on the upper surface of the diaphragm is greater than that on the under surface, (as would occur if normal atmospheric pressure is acting on the upper surface, and if there is a partial vacuum within the chamber 39 in the valve casing 37) then the greater pressure on the upper surface will cause the diaphragm to deflect downwardly to the position shown in dotted lines at 41k in Fig. 4, thus tensioning the diaphragm and causing the slit 43 to be pulled open. The atmosphere will then rush in through the slit into the chamber 39, neutralizing the partial vacuum therein. It is seen that the atmospheric pressure on the top of the diaphragm acts throughout the entire area thereof determined by the inner diameter of the flange 45 which supports the diaphragm, and because of the large diameter subjected to pressure, the diaphragm slit will open with only a very slight excess of pressure on the upper side over that present on the lower side. In practice, it is found that the valve will open when the pressure within the valve casing is as little as one pound to the square inch below the atmospheric pressure acting on the top of the diaphragm, thus providing a vacuum relief valve of very great sensitivity.

If it is desired to permit the formation of a higher vacuum within the valve casing before the valve opens, this may be accomplished by reducing the inner diameter of the flange 45, or by inserting a separate backing plate beneath the diaphragm, the effect in either event being to reduce the effective diameter of the diaphragm and thus to increase the pressure difference required to open the slit. The pressure difference at which the valve operates may also be increased by increasing the thickness of the diaphragm, or by making it of stiffer or less resilient material.

If the higher pressure is on the lower side of the diaphragm (as would occur when atmospheric pressure acts on the top of the diaphragm and when the valve chamber 39 is subject to pressure higher than atmospheric) then when the pressure beneath the diaphragm becomes slightly higher than that above it, the diaphragm will be moved upwardly from the natural bellied position above mentioned to some such position as that shown in full lines in Fig. 4, in which position the radial compression in the diaphragm will be fully effective to keep the slit 43 tightly closed. Further increase of the pressure on the lower face of the diaphragm will push upwardly on the diaphragm with greater force, moving the plate 51 upwardly as far as it will go under the influence of this particular degree of pressure, and causing that part of the diaphragm which is alined with the opening 57 to be deflected upwardly beyond the bottom surface of the plate 51. As this upward deflection of the central part of the diaphragm continues under increasing pressure, it will finally reach a point at which the slit 43 will open, as shown in Fig. 5, thus relieving the pressure by permitting escape of fluid (whether liquid or gas) from the lower side of the diaphragm through the open slit to the upper side of the diaphragm.

If it is desired to vary the degree of pressure required to open the diaphragm, this may be done by varying the size of the opening 57, as for example by substituting one or another of different rings 51 having different sized openings 57, or by screwing or otherwise fastening one or another of different size backing plates in the opening 57 to reduce it to various smaller sizes. More conveniently, however, the pressure at which the valve will open may be varied by using an adjustable backing member or overlying member, such as the annular ring 61 having inwardly and upwardly extending spokes 63 connected to a screw stud 65 screwed into a threaded boss 67 on a bridge 69 of skeleton form mounted on the plate 51. A lock nut 71 on the threaded shank 65 holds it in adjusted position. This ring 61 may, by turning its shank 65, be adjusted upwardly or downwardly so as to contact with the upper surface of the diaphragm at different extents of distension or bellying thereof, in the manner diagrammatically indicated in Fig. 5. When the pressure on the diaphragm causes it to contact with the ring 61, then further upward distension of the diaphragm to open the slit must occur mainly within the area outlined by the ring 61, which increases the pressure required to produce opening.

By turning the shank 65 to move the ring 61 upwardly away from the diaphragm, the pressure required beneath the diaphragm to open the slit 43 is decreased, and by moving the ring 61 downwardly, the pressure required is increased. Thus by adjusting the ring 61 upwardly or downwardly, a fine adjustment is secured of the pressure required within the chamber 39 over and above atmospheric pressure, in order to open the valve. Yet this adjustment is entirely independent of and does not affect the pressure required to open the valve in the opposite direction, when the pressure within the chamber 39 is below atmospheric pressure. By the use of this adjustment, the valve may be set to open at any desired pressure within reasonable limits, and a single valve may be adjusted to open at any desired pressure in the range, for example, of five pounds to thirty pounds per square inch above atmospheric pressure. Such a valve is found to be fluid tight until the pressure builds up to within a very small amount (one pound per square inch, for example) of the pressure for which the valve is set to open. By making the diaphragm of thicker or thinner material, or of material having greater or less resilience, further variation in the pressure at which the diaphragm slit will open may be obtained. By using one or more of the above mentioned variable factors or adjustment features, valves may be made to open at pressure differentials ranging from about one pound per square inch or lower, up to several hundred pounds per square inch.

At times it may be desired to prevent tampering with the valve or unauthorized change of its adjustment. When this is desired, a canopy or casing 135 may be provided, mounted on the upper part of the portion 67 of the bridge 69, as shown in Figs. 4 and 5, which casing has an annular depending flange surrounding the valve parts sufficiently closely to prevent access thereto, but spaced somewhat from the parts, as indicated, to permit entrance or escape of fluid. This casing 135 is held in place by a thumb nut 137 threaded on the top of the part 67, and unauthorized removal of this thumb nut may be prevented by any suitable locking means, such as the padlock 139 (Figs. 1 and 4) controlled by a key inserted through a keyhole 141, the bow 143 of the padlock being passed through a hole 145 in the upper end of the member 67.

A modified form of relief valve is illustrated in Figs. 6 to 9, inclusive, in which the valve body or casing 37a has a flange 33a for attachment to a tank or other desired article, and a flange 45a for supporting the diaphragm 41a which may be identical with the diaphragm 41 previously described and which has a slit 43a similar to the slit 43 above mentioned. The upper or overlying plate 51a may be either pivoted, like the plate 51 of the previous embodiment, or may be in fixed stationary position, since the pivotal mounting of the plate 51 is not necessary in this embodiment or in the embodiment previously described, so long as no other parts are to be operated by the movement of this plate. In the embodiment shown in Figs. 6 and 7, this plate 51a is stationary and is held in place by bolts 49a passing through the plate 51a and the flange 45a and through holes or notches in the interposed diaphragm 41a. The plate 51a is provided with an opening 57a, which, unlike the opening 57 above described, is not circular but is of different width or extent in different directions. The maximum width or dimension of the opening 57a is preferably greater than the length of the slit 43a, while the minimum dimension or narrowest part of the opening is preferably less than the length of the slit and the dimension of the opening in other directions varies between this maximum and minimum.

In this construction, the pressure required to cause the slit to open when the pressure within the valve casing exceeds atmospheric pressure, is adjusted or varied by alining the slit 43 with different dimensions of the opening 57a, so that a greater or smaller length of the slit is alined with the opening. When the slit is alined with the long dimension of the opening, as in Fig. 7, a lower pressure within the valve casing is sufficient to cause the valve slit to open. When the slit is alined with the smallest dimension of the opening, as in Fig. 9, then the plate 51a covers more or less of the ends of the slit, reducing the effective length of the slit and reducing the dimension in a direction parallel to the slit of that area of the diaphragm which is free to be deformed upwardly by the pressure within the valve casing, and this is found to require a substantially higher pressure to cause the valve slit to open. Between these two extreme positions the slit 43a may be placed in other desired positions, such as that shown in Fig. 8, where the length of the slit alined with the opening is greater than that in Fig. 9, but less than that in Fig. 7. When the opening is of approximately elliptical shape, as preferred and as here illustrated, then an almost infinite number of gradations of setting between the maximum pressure setting of Fig. 9 and the minimum pressure setting of Fig. 7 may be secured by turning the diaphragm in one direction or the other relatively to the opening.

This manner of adjusting the opening pressure or blow off pressure of the valve is relatively simple and requires no extra parts. This adjustment, like the adjustment obtained by moving the ring 61 previously described, does not affect the pressure at which the valve will open in one direction (when the pressure on the upper side of the diaphragm is greater than that below) but affects or varies only the opening pressure in the opposite direction (when the pressure below the diaphragm is greater than that above). If it is desired to vary the pressure at which the valve will open when the pressure above the diaphragm is greater than that below, then a backing plate may be placed beneath the diaphragm, to back up any desired part of the area thereof, and the opening in such plate may be either circular (like the opening 57 in the plate 51) or non-circular (like the opening 57a in the plate 51a). If a non-circular opening in such bottom plate is employed, it may be the same as or different from the opening 57a in the top plate 51a and it may be alined with the opening in the top plate or may be set at an angle thereto. By using below the diaphragm a plate identical with the plate 51a above the diaphragm, with the opening alined therewith, the valve would be made to open at the same pressure difference in either direction. By using the same kind of plate below the diaphragm but by turning the axis of the elliptical opening of the bottom plate at an angle to the axis of the opening in the top plate, the valve would be made to open at one pressure difference in one direction and at a different pressure difference in the opposite direction. Thus a construction of great flexibility and adaptability is provided.

To aid in setting the relief valve to desired pressure, a series of graduations 58 may be provided around the periphery of the opening 57a, and the various pressures at which the diaphragm will open when the slit 43a is alined with one or another of these graduations may be determined by experiment or otherwise. When once these pressures are determined, the valve may be quickly set to open at any desired one of these pressures by placing the diaphragm slit in alinement with the desired graduation. A change in setting may be made by loosening the bolts 49a and turning the plate 51a, leaving the diaphragm stationary, or by turning the diaphragm, leaving the plate stationary.

In some instances, the pressure at which the valve will open or blow off may be varied partly by using the non-circular opening idea illustrated in Figs. 6 to 9, and partly by using the adjustable ring 61 of the first embodiment above described. Such a construction is illustrated in Figs. 10 and 11, wherein the various parts, except for the opening 57, may be the same as those of the first embodiment illustrated in Figs. 2 to 5, inclusive, and are designated respectively by the same reference numerals used in Figs. 2 to 5 with the addition of the letter "b" to each numeral. The opening 57b in this embodiment, as shown in Fig. 11, is of non-circular shape, preferably being approximately elliptical, like the opening 57a in the embodiment shown in Figs. 6 to 9. By alining the diaphragm slit 43b with various different dimensions of the opening 57b (as described in connection with Figs. 6 to 9), the pressure difference on opposite sides of the diaphragm required to cause opening of the slit may be varied. By adjusting the ring 61b closer to or farther away from the normal unflexed position of the diaphragm, the pressure required for opening may also be varied. By a combination of these two adjusting means (that is, by varying the position of the slit with relation to the opening, and by varying the position of the ring with respect to the diaphragm), great flexibility of adjustment, within wide limits may be secured.

The constructions above described as illustrative examples of the invention have been designed primarily for use as relief valves to prevent building up any substantial vacuum or any excessive pressure in a tank or the like to which such valves are attached. In these constructions, atmospheric pressure operates on one side of the diaphragm. Those skilled in the art will recognize, however, that the functioning of the valve depends merely upon differences in pressures on opposite sides of the diaphragm, and not upon atmospheric pressures. Hence it is not necessary that one side be subjected to atmospheric pressure, and both sides of the diaphragm may, if desired, be subjected to super-atmospheric or sub-atmospheric pressures, the valve thus being capable of use as a pressure reducing valve or in many other fields besides that of relief valves.

The valve body or casing may be made of any desired material, metal being preferred, although a molded composition may be employed, if desired. If desired, the interior surface of the valve body, wherever it may come into contact with the fluid in the tank, pipe line, etc., with which the valve is used, may be lined or coated with glass or other suitable coating, and the tank or pipe line itself may be similarly lined. Stainless steel or other non-corrosive metals may be employed in constructing the valve.

In any of the illustrative embodiments of the invention above described, the valve may be made of various different sizes or dimensions. Without intending to place any limitation upon possible sizes, but merely for the sake of example, it may be stated that good results have been obtained from using a diaphragm 41 having an outside diameter of about 8 inches and a thickness of about $\frac{3}{16}$ inch, the slit 43 being about 1½ inches long, the other parts of the valve mechanism being of about the same proportions to these dimensions as are indicated in the accompanying drawings.

While certain embodiments of the invention have been disclosed, it is understood that the inventive idea may be carried out in a number of ways. This application is therefore not to be limited to the precise details described, but is intended to cover all variations and modifications thereof falling within the spirit of the invention or the scope of the appended claims.

I claim:

1. A relief valve including a diaphragm of resilient flexible material having an area normally lying approximately in a plane when fluid pressures acting on opposite sides of said area are equal and having a slit in said area, said slit being normally closed when said fluid pressures on opposite sides of said area are equal and being opened by displacement of that part of the diaphragm immediately around said slit in response to differences in fluid pressure on opposite sides of the diaphragm, clamping means for clamping said diaphragm around substantially all sides of said plane area, and means for adjusting the pressure difference necessary to open said slit in one direction.

2. A relief valve including a diaphragm of resilient flexible material having a slit therein, said slit being normally closed and a substantial portion of said diaphragm around said slit being approximately in a plane when fluid pressure on opposite sides of the diaphragm is equal and being opened by displacement of that part of the diaphragm immediately around said slit in response to differences in fluid pressure on opposite sides of the diaphragm, abutment means encircling said slit on one side of said diaphragm and normally spaced from said side of said diaphragm when fluid pressure on opposite sides of said diaphragm is equal, and means for adjusting said abutment means closer to or farther away from said diaphragm, to vary the degree of higher pressure required on the side of the diaphragm opposite to said abutment means in order to open said slit.

3. A relief valve including a diaphragm of resilient flexible material having a slit therein, said slit being normally closed and a substantial portion of said diaphragm around said slit being approximately in a plane when fluid pressure on opposite sides of the diaphragm is equal and being opened by displacement of that part of the diaphragm immediately around said slit in response to differences in fluid pressure on opposite sides of the diaphragm, a backing plate adjacent one side of said diaphragm against which said diaphragm may bear when there is an excess of pressure on the opposite side of the diaphragm, said backing plate having an aperture alined with at least a part of said slit, and abutment means adjustable toward and away from the normal undisplaced position of said diaphragm to vary the pressure difference needed to open said slit.

4. A relief valve including a diaphragm of resilient flexible material having a slit therein, said slit being normally closed when fluid pressure on opposite sides of the diaphragm is equal and being opened by displacement of that part of the diaphragm immediately around said slit in response to differences in fluid pressure on opposite sides of the diaphragm, and a backing plate adjacent one side of said diaphragm against which said diaphragm may bear when there is an excess of pressure on the opposite side of the diaphragm, said backing plate having an aperture alined with at least a part of said slit, said aperture having different dimensions in different directions in a plane approximately parallel to said diaphragm, at least some of said different dimensions being shorter than the length of said slit, so that the position of said backing plate and said diaphragm relatively to each other may be varied to change the effective length of said slit which is in alinement with said aperture and thereby to vary the degree of higher pressure required on the opposite side of said diaphragm from said backing plate in order to open said slit.

5. A valve including a diaphragm of flexible material having an area normally lying approximately in a plane when fluid pressures acting on opposite sides of said area are equal and having a slit in said area normally closed when said fluid pressures acting on opposite sides of said area are equal and being opened by displacement of the diaphragm material around said slit in response to sufficiently great differences in fluid pressure on opposite surfaces, clamping means for clamping said diaphragm around substantially all sides of said plane area, and means for varying the effective length of said slit to vary the pressure difference required to open said slit as a result of higher pressure on one surface of said diaphragm.

6. A valve including a diaphragm of flexible material having an area normally lying approximately in a plane when fluid pressures acting on opposite sides of said area are equal and having a slit in said area normally closed when said fluid pressures acting on opposite sides of said area are equal and being opened by displacement of the diaphragm material around said slit in response to sufficiently great differences in fluid pressure on opposite surfaces, clamping means for clamping said diaphragm around substantially all sides of said plane area, and means for varying the pressure difference at which said slit will open when the higher pressure is on one surface of the diaphragm, independently of the pressure difference at which said slit will open when the higher pressure is on the opposite surface of the diaphragm.

7. A valve including a diaphragm of flexible material having an area normally lying approximately in a plane when fluid pressures acting on opposite sides of said area are equal and having a slit in said area normally closed when said fluid pressures acting on opposite sides of said area are equal and being opened by displacement of the diaphragm material around said slit in response to sufficiently great differences in fluid pressure on opposite surfaces, clamping means for clamping marginal edges of said diaphragm around substantially all sides of said plane area to hold said marginal edges substantially in a plane, and an adjusting member having a hollow ring shaped face of a size to encircle at least a substantial part of the length of said slit and movable toward and away from the general plane of said area of said diaphragm to vary the pressure difference at which said slit will open under the influence of greater pressure on the face of said diaphragm opposite to said adjusting member.

WILLIAM DANA SCHANCK.